United States Patent
Newman

(10) Patent No.: US 7,578,356 B2
(45) Date of Patent: Aug. 25, 2009

(54) DISC FRAME VIBRATION DAMPENING SYSTEM

(75) Inventor: Michael R. Newman, Sullivan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/868,718

(22) Filed: Oct. 8, 2007

(65) Prior Publication Data

US 2009/0090523 A1 Apr. 9, 2009

(51) Int. Cl.
*A01B 35/28* (2006.01)
(52) U.S. Cl. .................... 172/572; 172/264; 172/621
(58) Field of Classification Search ............ 172/497, 172/568, 570, 572, 443, 142, 264, 551, 619, 172/621, 311
See application file for complete search history.

(56) References Cited

U.S. PATENT DOCUMENTS

| | | | |
|---|---|---|---|
| 848,825 A | 4/1907 | Hendon | |
| 989,232 A | 4/1911 | Copeland | |
| 1,125,974 A * | 1/1915 | Davidson | 172/572 |
| 2,336,848 A | 12/1943 | Cruse | |
| 2,760,424 A * | 8/1956 | Cooper | 172/561 |
| 2,907,394 A | 10/1959 | Cook | |
| 2,912,233 A * | 11/1959 | Gergely | 267/178 |
| 3,022,060 A * | 2/1962 | Cook et al. | 267/120 |
| 3,461,971 A | 8/1969 | Sprenkel | |
| 3,554,297 A | 1/1971 | Lehman | |
| 3,963,079 A | 6/1976 | Carlucci | |
| 4,066,132 A | 1/1978 | Rehn | |
| 4,073,347 A | 2/1978 | Philpot | |
| 4,079,347 A | 3/1978 | Poling | |
| 4,176,721 A * | 12/1979 | Poggemiller et al. | 172/4 |
| 4,313,503 A * | 2/1982 | Good et al. | 172/140 |
| 4,353,423 A * | 10/1982 | Poggemiller et al. | 172/260.5 |
| 4,407,372 A | 10/1983 | Rozeboom | |
| 4,574,715 A | 3/1986 | Dietrich, Sr. et al. | |
| 5,161,622 A * | 11/1992 | Godbersen | 172/140 |
| 5,165,486 A | 11/1992 | Davidson | |
| 5,590,721 A * | 1/1997 | Van Mill | 172/138 |
| 6,612,381 B2 * | 9/2003 | Powell et al. | 172/586 |
| 6,616,167 B2 * | 9/2003 | Guiet | 280/414.5 |
| 7,131,501 B1 | 11/2006 | Svendsen et al. | |
| 7,219,453 B2 * | 5/2007 | Baker | 37/232 |
| 2006/0065412 A1 * | 3/2006 | Bauer | 172/150 |

FOREIGN PATENT DOCUMENTS

EP 48197 A1 9/1981

* cited by examiner

*Primary Examiner*—Robert E Pezzuto
*Assistant Examiner*—Matthew D Troutman
(74) *Attorney, Agent, or Firm*—Rebecca Henkel

(57) ABSTRACT

A disc harrow composed of one or more disc gangs has a subframe coupled to the disc gangs to move the disc gangs in response to variations in farmland terrain to limit the impact of ground variation when encountered during the harrowing process. When the obstruction is cleared, the subframe automatically returns the disc gangs to their pre-obstruction position. In addition to reducing the potentially-damaging impact of obstructions, the subframe also maintains a more consistent reel depth during undulations or changes in the farmland terrain, such as during harrowing of slopes or unleveled fields such as valleys, near waterways, and along fence rows.

14 Claims, 2 Drawing Sheets

DISC FRAME VIBRATION DAMPENING SYSTEM

FIELD OF THE INVENTION

The present invention relates generally to agricultural implements, and in particular, to an implement having a spring and damper assembly to which a disc gang is mounted that maintains the disc gang at a relatively constant height yet absorbs the impact imparted by the disc gang when the disc gang encounters variations in terrain contours.

BACKGROUND OF THE INVENTION

Once a crop has been harvested, residual crop materials frequently remain on the farmland surface. Typically, these residual crop materials are incorporated within the soil profile of the farmland in an effort to maintain soil nutrient integrity. For example, management of corn cropped fields commonly includes the incorporation of the residual corn stalks with field soil once the corn, and occasionally a portion of the stalk, has been harvested. Whereas some growers harvest a majority of the kernel, cob, and stalk material, others harvest only the kernel and discharge a majority of the chaff or cob and stalk materials onto the farmland. Regardless of the quantity of stalk material that is harvested, the subsequent preparation of the farmland requires incorporation of the stalk or crop residue with the field soil. It is generally understood that the size of the crop residue particles as well as the surface area of the crop residue exposed to the soil affects crop residue decomposition. Specifically, reduced crop residue particle size and increased surface contact of the crop residue with adjoining soil improves crop residue decomposition.

Frequently, a crop residue conditioner, such as a stalk chopper, is pulled across the harvested field during autumn. The stalk chopper cuts the remaining stalks into smaller, more easily workable and degradable sized pieces. Thereafter, a disc harrow is used to smooth and level the farmland or seedbed and till a portion of the crop residue with the soil. The disc harrow not only mixes the crop residue with the underlying soil to return nutrients to the soil, but also can be used to establish a residue layer over the farmland to protect against erosion and provide moisture control during the winter months before replanting in the spring.

Disc harrows include one or more disc gangs, each including a series of steel discs or reels with tapered or beveled peripheral edges. The discs, although tending to roll or rotate as they are pulled forward, penetrate into and break up the soil and stalks and other crop residue. The soil and crop residue then ride along and across the concave surfaces so as to be turned or inverted. A portion of the residue is buried with this turning, with the percentage of buried residue increasing with the amount of soil turning. The amount of crop residue that is retained on the seedbed surface may also be controlled by setting the angle of attack or "gang angle", such as described in U.S. Pat. No. 6,612,381, the disclosure of which is incorporated herein by reference.

During harrowing of the farmland the disc harrow may encounter various obstructions, such as rocks, stumps, and roots. To reduce the impact of such obstructions and thereby potential damage to the disc harrow, the disc gangs are often resiliently supported on the harrow mainframe so that each gang can independently yield to the obstructions. Conventionally, the reels are mounted to a shaft or axle which is then mounted to the harrow mainframe via U-shaped or C-shaped spring members, also referred to as shanks or cushions. These spring members are designed to maintain a uniform depth of the reels and flex when the reels meet with an obstruction. Exemplary spring members are illustrated in U.S. Pat. No. 4,066,132 to Rehn, U.S. Pat. No. 4,407,372 to Rozeboom, and U.S. Pat. No. 7,131,501 to Svendsen et al. While such cushions are generally effective at maintaining a uniform depth of the disc gangs and flexing in response to any obstruction, their effectiveness is limited at reducing the impact of the obstruction on the harrow mainframe.

Thus, there remains a need for a farm implement having a shock absorbing assembly that not only maintains the disc gangs at a uniform depth, but also absorbs the impact of the natural ground variation and larger obstructions during the harrowing process in a manner that places less stress on the farm implement when such ground conditions are encountered.

SUMMARY OF THE INVENTION

The present invention is directed to a disc harrow having a disc frame carrying one or more disc gangs and coupled to a mainframe. The disc frame is designed to allow the disc gangs to respond to variations in the farmland terrain to limit the impact of ground variations when encountered during the harrowing process. Specifically, the disc frame is coupled to the mainframe by a series of struts that hold the disc frame at a relatively constant height yet absorb the impact that results when the disc gangs encounter ground variation. Each strut includes a spring component that is biased to maintain a constant depth of the disc gangs. Each strut also has a damper component that absorbs the movement associated with the disc gang as it follows the ground contours and variations. As a result, the force of the impact is absorbed by the strut and the amount of force that is transferred to the mainframe is reduced.

Therefore, in accordance with one aspect, the present invention is directed to a disc harrow having a mainframe and a disc frame coupled to the main frame. The disc harrow further has a disc gang assembly coupled to the disc frame and composed of a plurality of crop residue and soil tilling reels. A strut is interconnected between the disc frame and the mainframe, and is configured to hold the disc gang assembly at a relatively constant depth and absorb the impact associated with the disc gang assembly encountering ground variation during harrowing of a farmland.

According to another aspect, the present invention includes a farm implement for tilling farmland. The farm implement has a mainframe defined by a pair of rails and a harrow. The farm implement further has a strut interconnected to the main frame and the harrow. The strut is adapted to support the harrow yet allow limited movement of the disc frame along only a single axis relative to the mainframe when the harrow encounters ground variation.

In accordance with another aspect of the present invention, an apparatus for tilling crop residue and soil is presented. The apparatus has a disc harrow including a first disc gang and a second disc gang connected to the first disc gang by a floating frame. A mainframe is defined by a pair of rails and a plurality of transverse supports, and carries the disc harrow and is coupled to the floating frame by at least one strut. The at least one strut is adapted to maintain the disc harrow at a defined depth during normal working operation and automatically dampening any force presented when the disc harrow encounters ground variation during harrowing of a field.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE PREFERRED EMBODIMENTS

Figure 1:
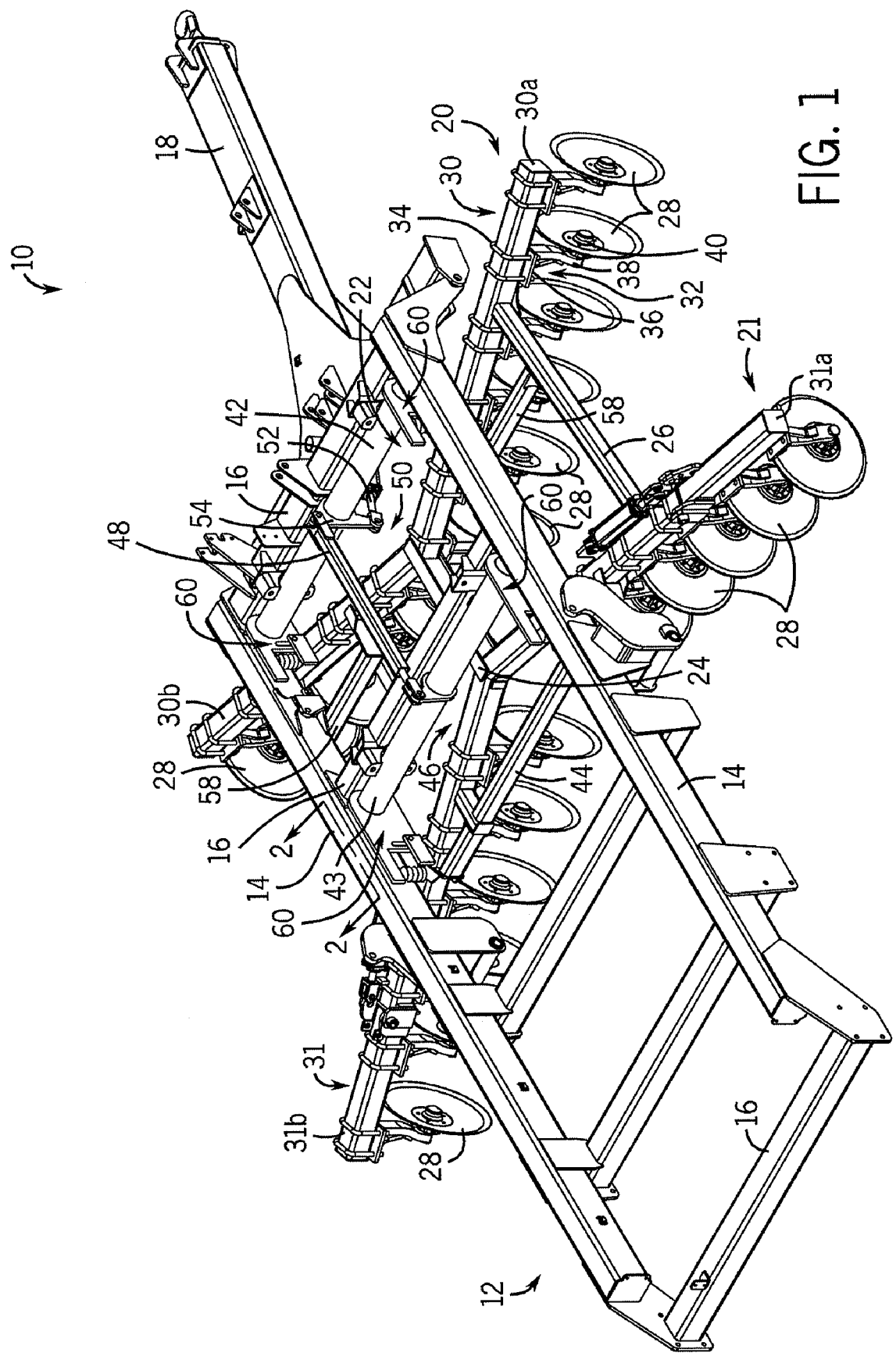
FIG. 1 is an isometric view of a disc harrow according to one aspect of the invention.

Referring now to FIG. 1, a disc harrow 10 has a mainframe 12 defined by a pair of rails 14 connected to one another by a series of transverse supports 16 spaced from one another along the length of the rails 14. The disc harrow 10 is designed to be towed by a tractor or other powered device. In this regard, the disc harrow 10 includes a hitch 18 for connecting the mainframe 12 to the tractor. In the illustrated embodiment, the disc harrow 10 includes a pair of disc gangs 20, 21 mounted to the mainframe 12 using a subframe or disc frame 22, which will be described in greater detail below. The pair of disc gangs includes a forward disc gang, designated by numeral 20, and a rearward disc gang, designated by numeral 21.

The disc gangs 20, 21 are connected to one another by an I-beam 24 and a pair of gang braces 26, only one of which is visible in the figure. Each disc gang 20, 21 has a series of reels or discs 28 each of which is mounted to a disc support beam 30, 31, respectively, by a clamping device 32. In the illustrated example, each disc support beam 30, 31 has a pair of support arms 30a, 30b and 31a, 31b, respectively. The support arms are angled relative to one another in such a manner that disc support beam 30 is generally V-shaped whereas disc support beam 31 has a generally inverted V shape. The support arms 30a, 30b, 31a, 31b, and I-beam 24 collectively form an A-frame. Each clamping device 32 includes a clamp 34 fastened to a clamp plate 36 having a downwardly extending arm 38 that connects to the hub 40 of each reel 28.

The subframe 22 has a forward rockshaft 42 and a rearward rockshaft 43 spaced from one another and coupled to respective transverse supports 16 using suitable connectors. The rearward rockshaft 43 has a strut 60 attached permanently to both ends of the rockshaft. The strut 60 is attached to support arm 31a on one side and 31b on the other side. The disc support arm 31 is raised and lowered by rotating the rockshaft thereby changing the operating depth of the disc unit. The forward rockshaft 42 is of similar construction having a strut 60 attached to both ends which are attached to support arm 30a and 30b. More particularly, rearward rockshaft 43 mechanically communicates with forward rockshaft 42 via piston 48 that is coupled to forward rockshaft 42. The piston 48 is also connected to an actuator 52 via a lever 54 that is rotatable about forward rockshaft 42. In this regard, the actuator 52 may be energized to pull lever 54 forward to lower the forward disc gang 20 and the rearward disc gang 21 or push lever 54 rearward to raise the forward disc gang 20 and the rearward disc gang 21. When lowering the disc gangs 20, 21, the actuator 52 is activated so that lever 54 pushes piston 48 rearward, which causes rockshaft 43 and attached strut 60 to rotate downward thereby resulting in the rearward disc gang 21 being lowered in concert with the forward disc gang 20. When raising the disc gangs 20, 21, the actuator 52 is activated so that lever 54 pulls piston 48 forward, which causes rockshaft 43 and strut 60 at each end to rotate upward, thereby resulting in the disc gangs 20, 21 being raised. This construction allows the disc gangs 20, 21 to be positioned at an infinite number of heights defined between the rotational limits of levers 54, 56. The subframe 22 also includes a pair of lateral supports 58 interconnected between braces 26 and gang arms 30a, 30b.

Figure 2:
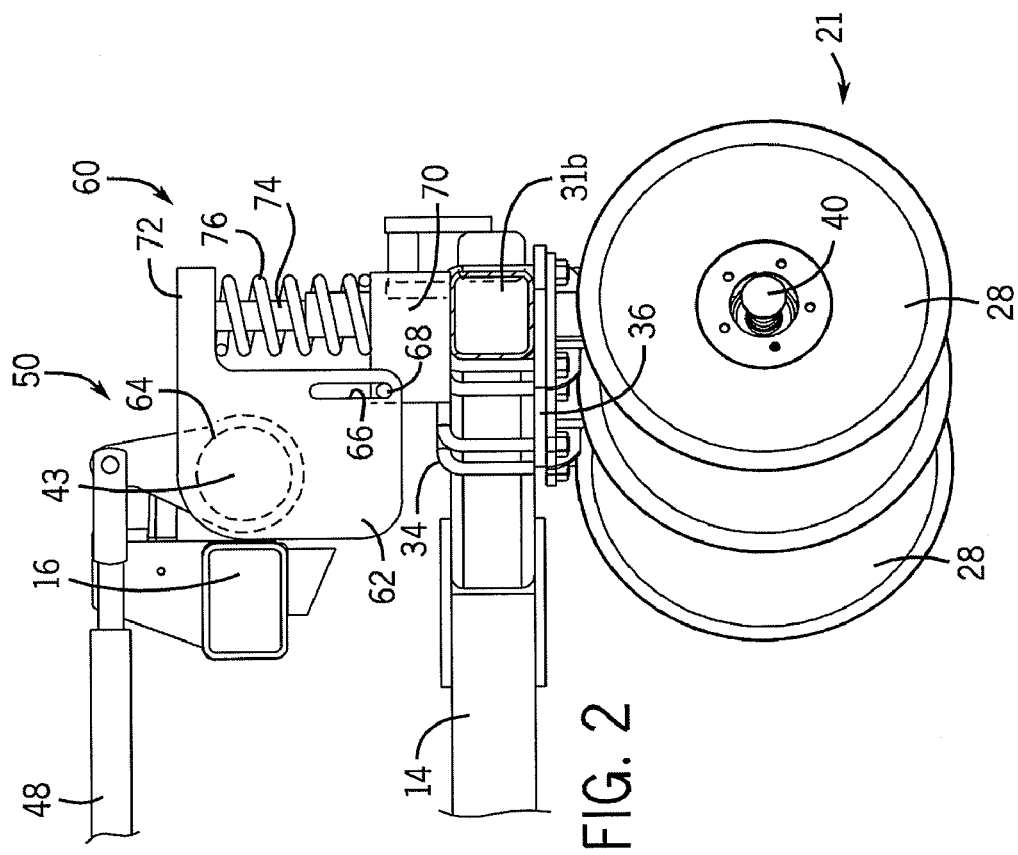
FIG. 2 is a section view of the disc harrow taken along line 1-1 of FIG. 1.

As further shown in FIG. 2, each strut 60 includes a bracket 62 which is attached to the end of a rockshaft, such as rockshaft 42. For purposes of description, only one strut 60 will be described, but it is understood that the other struts are similarly constructed. The bracket 62 includes a vertically oriented slot 66 that defines a range of motion for pin 68 that is connected to or otherwise a part of a mounting lug 70. The mounting lug 70 is coupled to a disc arm, thereby coupling the disc gang to bracket 62. Bracket 62 has an arm 72 with a shock absorber 74 extending downwardly thereon and into engagement with mounting lug 70. The shock absorber 74 extends concentrically through spring 76.

Figure 3:
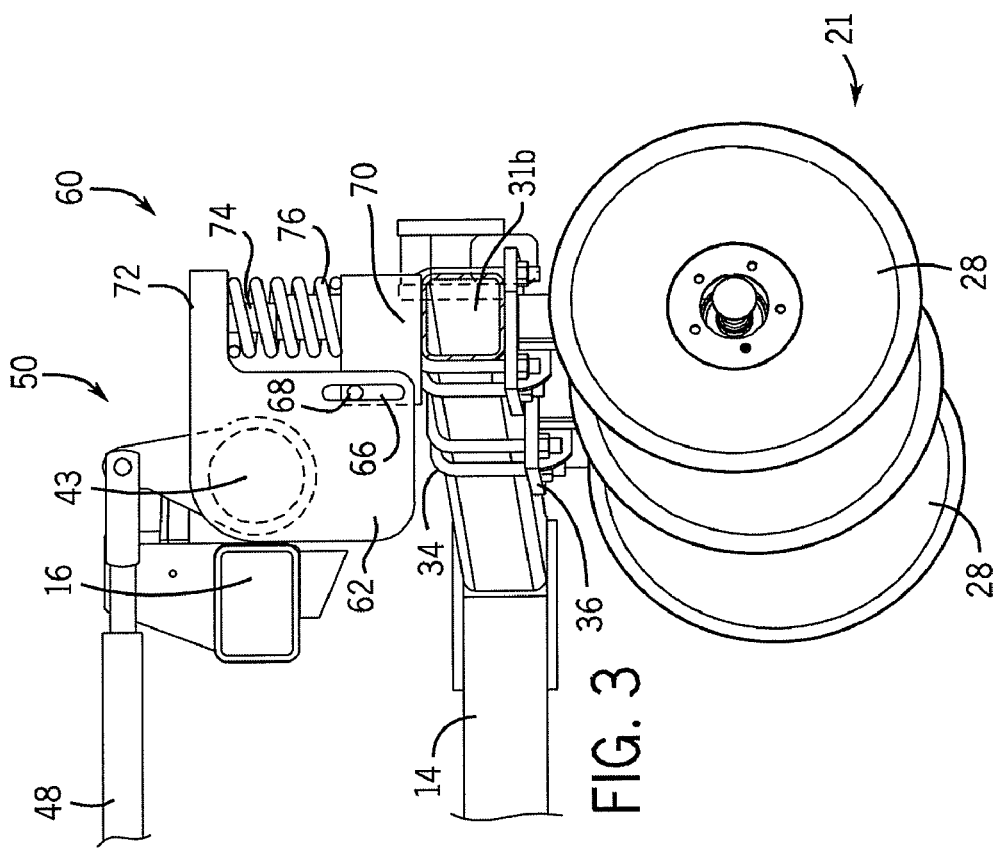
FIG. 3 is a section view similar to FIG. 2 showing movement of a disc gang from a normal working position to a clear-an-obstruction position.

The spring 76 presents a spring load on the disc gang, such as disc gang 21. During unobstructed passage of the disc gang 21, the spring load maintains the depth of the disc gang 21 at a relatively constant level. When an ground variation is encountered, spring 76 will deflect slightly compensating for the ground variation. Shock absorber 74 is operative to absorb or otherwise damper the energy transferred from the disc gang 21 to the bracket 62 when the ground variation is encountered. As such, when ground variation is encountered, the spring 76 will deflect and the disc gang will rise relative to the mainframe 12, as shown in FIG. 3 without the mainframe 12 also experiencing the shock of the ground variation. In this regard, the shock absorber 74 and spring 76 effectively support the weight of the disc gang 21 but also provide dampening of the forces transferred thereto by the disc gang 21 when ground variation is encountered.

Pin 68 is snuggly received when slot 66 so that the pin 68 is only allowed to move vertically within the slot 66. Thus, the disc gang 21 is only permitted to float, in response to an encountered ground variation, along only a single axis. More particularly, the pin 68 and slot 66 arrangement does not allow the disc gang 21 to oscillate fore and aft when ground variation is encountered.

In one preferred embodiment, there is a pair of struts 60 associated with each disc gang 20, 21; however, it is understood that fewer than two or more than two struts may be used. For example, in one alternate embodiment, a single strut 60 is used for each disc gang 20, 21. In this alternate embodiment, the struts 60 are connected to the disc gangs 20, 21 at opposing rails 14 of the mainframe 12.

The present invention has been described with respect to a disc harrow, but is understood that the present invention is equivalently applicable with other soil tilling implements. Moreover, the invention may be applicable for a stand-alone disc harrow or a farm implement carrying multiple types of soil tillage tools. For example, cultivating tines may be coupled to the transverse supports 16. Additionally, it is contemplated that the reels 28 of the disc gangs 20, 21 may be of similar size or of dissimilar size. For example, the forward disc gang 20 may have large reels for primary tillage whereas the rearward disc gang 21 may have smaller reels for secondary tillage.

Many changes and will modifications could be made to the invention without departing from the spirit thereof. The scope of these changes will become apparent from the appended claims.

I claim:

1. A disc harrow for tilling ground comprising:
a mainframe having a pair of rails;
a plurality of transverse supports connected to said pair of rails along the length of said rails;
a disc frame including a gang assembly;
said disc frame having a plurality of discs mounted to a disc support beam;
said mainframe having a subframe; wherein said subframe having a rockshaft;
said rockshaft having a strut rigidly attached to said rockshaft;
said disc support beam having a support arm;
said strut attached to said support arm; wherein said disc support beam is raised and lowered by rotating the rockshaft;
said strut includes a carrier bracket interconnected between said rockshaft and said disc frame;
said carrier bracket having an elongated slot;
a mounting lug inner connected between said strut and said disc frame;
said carrier bracket having a carrier bracket arm;
a shock absorber coupled to said carrier bracket arm extending downwardly thereon and engaged with said mounting lug;
a spring wherein said shock absorber extends concentrically through said spring;
said mounting lug includes a guide pin;
said guide pin moves vertically within said slot; wherein said disc gang floats in response to an encountered ground variation along only a single axis;
wherein said guide pin moves vertically within the slot allowing said disc gang not to oscillate fore and aft when ground variations are encountered.

2. The disc harrow of claim 1 wherein the slot is adapted to allow only vertical movement of the pin therealong.

3. The disc harrow of claim 1 wherein the disc gang assembly includes an I-beam coupling a first disc gang and a second disc gang to one another.

4. The disc harrow of claim 1 wherein said strut includes a pair of struts inner connected between the mainframe and the spring and shock absorber assembly.

5. The disc harrow of claim 4 wherein the pair of struts is coupled to the mainframe in a pivot connection that allows the pair of struts to rotate relative to the mainframe.

6. A farm implement for tilling a farmland, comprising:
a mainframe defined by a pair of rails;
a harrow having a plurality of transverse supports connected to said pair of rails;
a disc frame including a gang assembly;
said disc frame having a plurality of discs mounted to a disc support beam;
said mainframe having a subframe; wherein said subframe having a rockshaft;
said rockshaft having a strut rigidly attached to said rockshaft;
said disc support beam having a support arm;
said strut attached to said support arm; wherein said disc support beam is raised and lowered by rotating the rockshaft;
said strut includes a carrier bracket interconnected between said rockshaft and said disc frame;
said carrier bracket having an elongated slot;
a mounting lug inner connected between said strut and said disc frame;
said carrier bracket having a carrier bracket arm;
a shock absorber coupled to said carrier bracket arm extending downwardly thereon and engaged with said mounting lug;
a spring wherein said shock absorber extends concentrically through said spring;
said mounting lug includes a guide pin;
said guide pin moves vertically within said slot; wherein said disc gang floats in response to an encountered ground variation along only a single axis;
wherein said guide pin moves vertically within the slot allowing said disc gang not to oscillate fore and aft when ground variations are encountered;
and
wherein said strut interconnected to the mainframe and the harrow, the strut adapted to allow limited movement of the disc frame along only a single axis relative to the mainframe when the harrow encounters ground variation.

7. The farm implement of claim 6 wherein the disc gang includes a pair of said disc gangs, each of the pair of disc gangs including a plurality of crop residue and soil tilling discs, and wherein the harrow further includes an I-beam interconnecting the pair of disc gangs.

8. The farm implement of claim 7 wherein the pair of disc gangs includes a first disc gang supported by a first disc support beam having a first support arm and a second support arm connected to the first support arm at the I-beam, and further includes a second disc gang supported by a second disc support beam having a third support arm and a fourth support arm connected to the third support arm at the I-beam.

9. The farm implement of claim 8 wherein the first support arm and the second support arm are interconnected so that the first support beam has a V-shape and wherein the third support arm and the fourth support arm are interconnected so that the second support beam has an inverted V-shape.

10. The farm implement of claim 6 wherein said rockshaft includes a first rockshaft coupled transversely to the pair of rails and a second rockshaft coupled transversely to the pair of rails, and further comprising a first and second strut associated with the first rockshaft and a third and fourth strut associated with the second rockshaft.

11. The farm implement of claim 10 wherein each mounting bracket and mounting lug are operative to allow displacement of the mounting lug to the mounting bracket.

12. An apparatus for tilling crop residue and soil, comprising:
a floating frame;
a disc harrow including a first disc gang and a second disc gang connected to the first disc gang by the floating frame;
a mainframe defined by a pair of rails and a plurality of transverse supports, the mainframe carrying the disc harrow and coupled to the floating frame by at least one strut;
said strut includes a carrier bracket interconnected to a rockshaft and said floating frame;
said carrier bracket having an elongated slot;
a mounting lug inner connected between said strut and said disc frame;
said carrier bracket having a carrier bracket arm;

a shock absorber coupled to said carrier bracket arm extending downwardly thereon and engaged with said mounting lug;

a spring wherein said shock absorber extends concentrically through said spring;

said mounting lug includes a guide pin;

said guide pin moves vertically within said slot; wherein said disc gang floats in response to an encountered ground variation along only a single axis;

wherein said guide pin moves vertically within the slot allowing said disc gang not to oscillate fore and aft when ground variations are encountered;

and wherein said at least one strut interconnected to the mainframe and the harrow, the at least one strut adapted to allow limited movement of the disc frame along only a single axis relative to the mainframe when the harrow encounters ground variation;

and wherein the at least one strut is adapted to maintain the disc harrow at a defined depth during normal working operation and damper any force presented thereto when the disc harrow encounters ground variation during harrowing of a field.

13. The apparatus of claim 12 wherein the at least one strut is further adapted to automatically restore the disc harrow to the defined depth once the obstruction has been cleared.

14. The apparatus of claim 12 wherein the at least one strut includes at least a first strut and a second strut spaced from the first strut, wherein the first strut and the second strut cooperate to prevent oscillation of the disc harrow when ground variation is encountered during harrowing of a field.

* * * * *